July 11, 1961  W. F. GOLDING  2,991,998
SHEET DELIVERY APPARATUS
Filed May 8, 1959  2 Sheets-Sheet 1
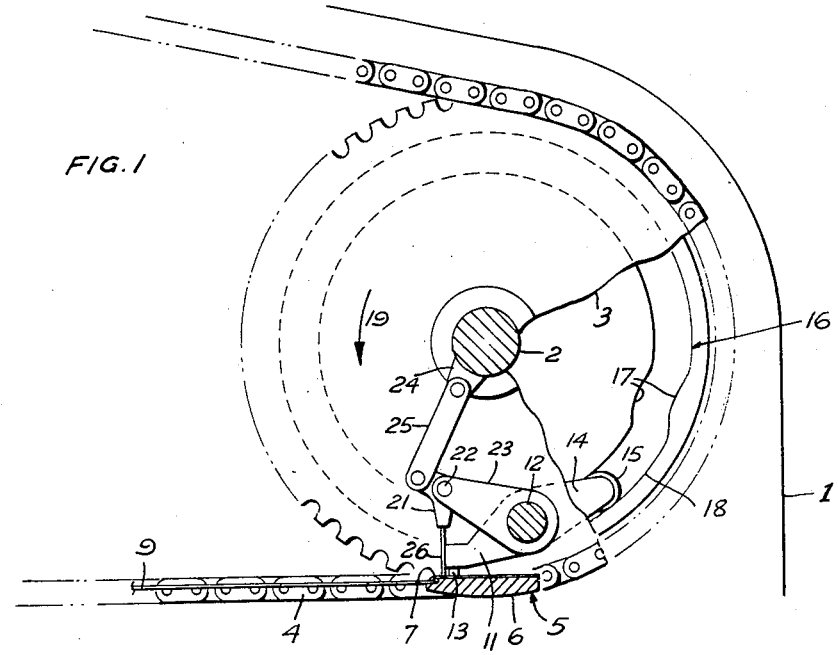
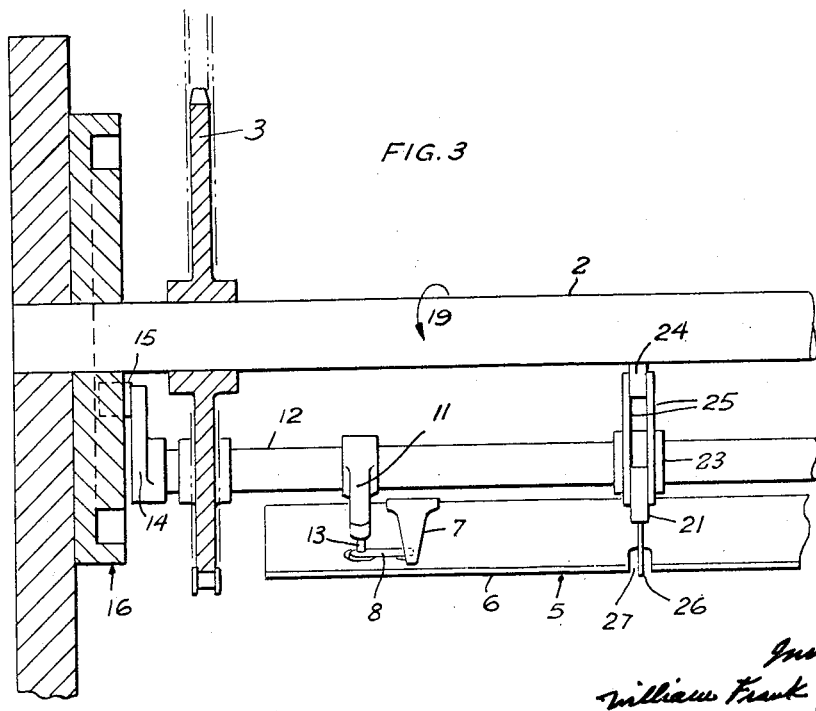

July 11, 1961 W. F. GOLDING 2,991,998
SHEET DELIVERY APPARATUS
Filed May 8, 1959 2 Sheets-Sheet 2

Inventor
William Frank Golding
by Albert Jacks
attorney

United States Patent Office 2,991,998
Patented July 11, 1961

2,991,998
SHEET DELIVERY APPARATUS
William Frank Golding, 22 Parrys Close, Stoke Bishop, Bristol, England
Filed May 8, 1959, Ser. No. 811,836
Claims priority, application Great Britain May 12, 1958
5 Claims. (Cl. 271—68)

This invention relates to sheet delivery apparatus.

According to this invention I provide sheet delivery apparatus for printing or like machines comprising two parallel endless chains, a plurality of bars extending transversely between the chains and connected thereto at regular intervals, each bar being provided with jaws for gripping a sheet, a pair of rotatable sprockets over which the chains are trained, the chains being movable to move the bars sequentially past the sprockets through an arcuate path corresponding to the lie of the chains around the sprockets, the diameter of the sprockets being such that the sprockets make one revolution for the passage therearound of each bar, a device for opening the jaws, said device being connected to the sprockets to travel in juxtaposition with the successive bars as passing through said arcuate path, said device co-operating to open the jaws of successive bars during said juxtaposed travel by an operative movement of the device relative to the bars, and stationary cam means co-operating with said device to impart thereto said operative movement.

The apparatus according to this invention may comprise means for ejecting said sheet from the jaws of the associated bar, said means being timed to operate incident upon the jaws having been opened by said device.

One form of apparatus according to this invention will now be described with reference to the accompanying drawings wherein:

FIG. 1 is a sectional elevation of the apparatus.

FIG. 3 is a section on the line III—III in FIG. 2.

Figure 2:
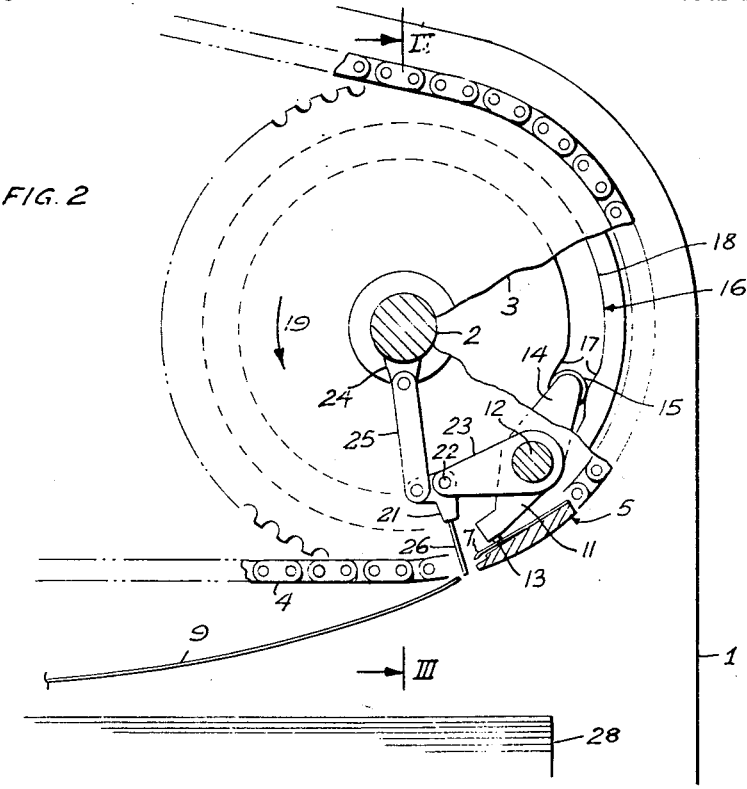
FIG. 2 is a sectional elevation similar to FIG. 1 but showing the apparatus in a different operational position.

Referring to FIGS. 1 to 3, there is provided a side frame 1 in which is journalled a sprocket shaft 2 to which is secured a sprocket 3 for an endless conveyor chain 4 provided with a gripper 5 comprising a bar or common lower jaw 6 having secured thereto a leaf spring or upper jaw 7, a lever 8 (FIGS. 3 and 4) pivoted to the bar 6 being adapted to flex and thus open the jaw 7 thereby to release a sheet 9 gripped between the jaw 7 and bar 6.

It is to be understood that the side frame 1 is one of two opposite side frames supporting the shaft 2 between them; that the chain 4 is one of two such chains supporting the bar 6 between them; that the jaw 7 and lever 8 are each one of a plurality of such jaws and levers provided along the bar 6; and that a plurality of grippers 5 are provided at intervals along the chain 4 which is driven with an intermittent motion for successive grippers to stop when arriving at the sprocket 3.

An extension or lever 11 secured to a rocker shaft 12 is provided with a pin 13 positioned to depress one end of the lever 8 thereby to open the jaw 7 when the shaft 12 is pivoted. The shaft 12 is journalled in the sprocket 3 in a position off-set from and parallel to the shaft 2 and has secured thereto an extension or lever 14 defining a cam follower and provided with a roller 15 engaging a stationary track cam 16 secured to the side frame 1. The cam 16 comprises a pair of lobes 17, the remaining portion of the cam 16, denoted 18, being concentric with the shaft 2. The elements 11 to 15 inclusive define a gripper opening device.

The sprocket 3 is driven by the chain 4, the sprocket in turn moving the lever 11 through an orbit about the shaft 2. The arc of engagement between the chain 4 and the sprocket 3 defines the end of the delivery run and the beginning of the return run of the chain 4, i.e. the sheet 9 is released from the gripper 5 while the latter is situated on an arcuate path through which it passes in accordance with the lie of the chain 4 around the sprocket 3. The diameter of the sprocket 3 is so related to the spacing of successive grippers 5 along the chain 4 that the sprocket 3 makes one revolution for the passage of each gripper 5 through said arcuate path, and the angular position of the sprocket 3 is so related to the chain 4 that as each gripper 5 passes through its arcuate path the lever 11 passes on the inside of this path in juxtaposition with the gripper 5. In other words, the sprocket 3 co-operates to guide the gripper opening device through an arcuate path in juxtaposition with the gripper 5. The direction of rotation of the sprocket is indicated by an arrow 19.

FIG. 1 shows the position of the gripper 5 at the commencement of its travel in juxtaposition with the lever 11. In this position the roller 15 is situated in the concentric portion 18 of the cam 16 and the free end of the pin 13 is situated in close proximity with but clear of the lever 8.

When the gripper 5 approaches the position shown in FIG. 2 the lobes 17 co-operate to pivot the shaft 12 in a direction causing the pin 13 to depress the lever 8 thereby opening the jaw 7 and releasing the sheet 9. The intermittent motion of the chain 4 is timed for the latter to stand still when the gripping device is in the position shown in FIG. 2, i.e. since the actuation of the lever 11 depends on the chain 4 being in motion, the stopping of the chain 4 is timed not to take place until the lever 11 has been actuated to release the sheet 9.

Figure 4:
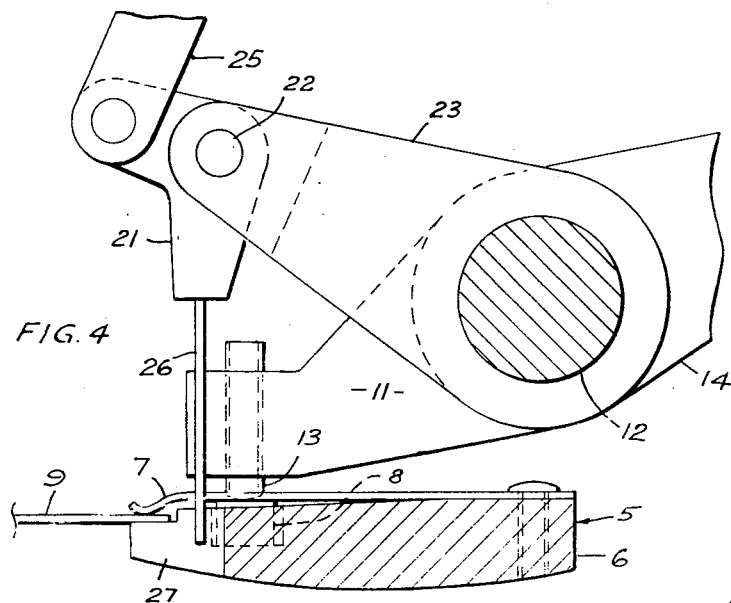
FIG. 4 is an enlarged detail of the apparatus operationally positioned as in FIG. 1.

There may be a tendency for the sheet 9 not to slip freely from the bar 6 when the jaw 7 is opened and to overcome this difficulty means are provided to eject the sheet 9 positively from the gripper 5. These means comprise a bell crank lever 21 the fulcrum 22 of which is provided on one end of a lever 23 the other end of which is secured to the shaft 12. One end of the bell crank lever 21 is connected to a lug 24 on the shaft 2 through a pivotal link 25 while the other end of the bell crank lever 21 is provided with an extension or ejector finger 26. The bell crank lever 21 is so positioned that the finger 26 engages a recess 27 in the trailing edge portion of the bar 6 in front of the leading edge of the sheet 9 (FIG. 4). This engagement takes place when the gripper 5 approaches the position shown in FIG. 1. When the shaft 12 is pivoted upon approach of the gripper to the position shown in FIG. 2, the levers 23 and 21 co-operate to move the finger 26 backwards in respect of the direction of travel of the gripper 5 whereby the finger 26 abuts the leading edge of the sheet 9 and pushes the latter from the bar 6. FIG. 2 shows this ejecting movement as having taken place, the sheet 9 being shown as falling towards a pile 28.

For purposes of adjusting the timing of the opening of the gripper 5, the cam 16 is arranged to be rotatable about the shaft 2 and said timing adjustment is made by rotating the cam. Screws (not shown) are provided for securing the cam 16 to the frame 1 in the position in which the cam 16 has been set by said adjustment.

What I claim and desire to secure by Letters Patent is:
1. Sheet delivery apparatus for printing and like machines comprising two parallel endless chains, a plurality of bars extending transversely between the chains and connected thereto at regular intervals, each bar being provided with jaws for gripping an edge portion of a sheet, a pair of rotatable sprockets over which the chains are trained, the chains being movable to move the bars sequentially past the sprockets through an arcuate path corresponding to the lie of the chains around the sprockets, the diameter of the sprockets being such that the sprockets make one revolution for the passage therearound of each bar, a device for opening the jaws of each bar when situated in said arcuate path, a member connected to the sprockets to travel in juxtaposition with each bar as passing through said arcuate path, said member being movable relative to the sprockets and means for moving said member to engage said sheet edge portion to eject the sheet from the jaws of said bar, said means co-operating with said device to eject the sheet when the jaws are opened.

2. Sheet delivery apparatus for printing and the like machines comprising two parallel endless chains, a plurality of bars extending transversely between the chains and connected thereto at regular intervals, a pair of rotatable sprockets over which the chains are trained, the chains being movable to move the bars sequentially past the sprockets through an arcuate path corresponding to the lie of the chains around the sprockets, the diameter of the sprockets being such that the sprockets make one revolution for the passage therearound of each bar, each bar being provided with jaws co-operating to press on to the upper surface of the trailing edge portion of the bar thereby to grip a sheet at an edge portion thereof overlapping said edge portion of the bar, a recess provided in said edge portion of the bar and dimensioned to extend towards the leading edge thereof by an amount greater than the extent of the overlap between the sheet and the bar, an aperture being defined by the leading extremity of said sheet edge portion and said recess where extending beyond said overlap, a finger connected to the sprockets to travel in juxtaposition with each bar as passing through said arcuate path and positioned to enter said aperture at the commencement of said juxtaposed travel, and means for moving said finger relative to the sprocket to engage said extremity and push the sheet from the bar, said jaws being openable to release the sheet, and said jaws co-operating to release the sheet prior to the engagement of said extremity by said finger.

3. Apparatus according to claim 1, said means for moving said member comprising a rocker shaft connected to said sprockets to move together therewith, the rocker shaft being supported for oscillation about an axis off-set from and parallel to the axis of the sprockets, and means for oscillating said shaft, said member being connected to said shaft to be moved thereby to eject said sheet during the oscillation of said shaft.

4. Apparatus according to claim 3, comprising a lever secured to said shaft, a link connected between said lever and said member to transmit the oscillation of said shaft to said member.

5. Sheet delivery apparatus for printing or like machines comprising two parallel endless chains, a plurality of bars extending transversely between said chains and connected thereto at regular intervals, each bar being provided with jaws for gripping a sheet, a pair of rotatable sprockets over which the chains are trained, the chains being movable to move the bars sequentially past the sprockets through an arcuate path corresponding to the lie of the chains around the sprockets, the diameter of the sprockets being such that the sprockets make one revolution for the passage therearound of each bar, a rocker shaft connected to the sprockets to move together therewith, the rocker shaft being supported for oscillation about an axis off-set from and parallel to the axis of the sprockets, means for oscillating said shaft when the bar is situated in said arcuate path, a gripper operating member connected to said shaft to be movable thereby and positioned to travel in juxtaposition with the bar as passing through said arcuate path, said gripper operating member co-operating to open the jaws when the shaft is oscillated, a sheet ejecting member connected to said shaft to be movable thereby and positioned to travel in juxtaposition with the bar as passing through said arcuate path, said sheet ejecting member co-operating to engage the leading edge of the sheet and push the sheet from said jaws when the shaft is oscillated, the relationship between said gripper operating and sheet ejecting members being timed so that the sheet is engaged by the latter member incident upon the jaws having been opened.

References Cited in the file of this patent
UNITED STATES PATENTS
1,646,529     Fallot _____ Oct. 25, 1927